US011729113B2

(12) United States Patent
Karamanolis et al.

(10) Patent No.: US 11,729,113 B2
(45) Date of Patent: *Aug. 15, 2023

(54) TRANSLATING HIGH LEVEL REQUIREMENTS POLICIES TO DISTRIBUTED STORAGE CONFIGURATIONS

(71) Applicant: VMware, Inc., Palo Alto, CA (US)

(72) Inventors: Christos Karamanolis, Los Gatos, CA (US); William Earl, Boulder Creek, CA (US); Eric Knauft, San Francisco, CA (US); Pascal Renauld, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/320,145

(22) Filed: May 13, 2021

(65) Prior Publication Data

US 2021/0266268 A1    Aug. 26, 2021

Related U.S. Application Data

(63) Continuation of application No. 14/469,424, filed on Aug. 26, 2014, now Pat. No. 11,018,988.

(60) Provisional application No. 61/870,158, filed on Aug. 26, 2013.

(51) Int. Cl.
*H04L 47/783* (2022.01)
*H04L 67/10* (2022.01)
*G06F 12/0802* (2016.01)
*H04L 67/1097* (2022.01)

(52) U.S. Cl.
CPC ........ *H04L 47/783* (2013.01); *G06F 12/0802* (2013.01); *H04L 67/10* (2013.01); *H04L 67/1097* (2013.01)

(58) Field of Classification Search
CPC ... H04L 47/783; H04L 67/10; H04L 67/1097; G06F 12/0802
See application file for complete search history.

(56) References Cited

U.S. PATENT DOCUMENTS

| | | | |
|---|---|---|---|
| 5,768,500 A | 6/1998 | Agrawal et al. | |
| 6,493,810 B1 * | 12/2002 | Pang | H04L 67/2852 711/130 |
| 6,658,473 B1 | 12/2003 | Block et al. | |
| 6,839,752 B1 | 1/2005 | Miller et al. | |
| 7,177,774 B1 * | 2/2007 | Brown | G06Q 10/06 702/182 |
| 7,464,147 B1 | 12/2008 | Fakhouri et al. | |
| 7,787,492 B2 | 8/2010 | Timus et al. | |

(Continued)

*Primary Examiner* — Viet D Vu
(74) *Attorney, Agent, or Firm* — Dinsmore & Shohl LLP

(57) ABSTRACT

Embodiments of the disclosure provide techniques for partitioning a resource object into multiple resource components of a cluster of host computer nodes in a distributed resources system. The distributed resources system translates high-level policy requirements into a resource configuration that the system accommodates. The system determines an allocation based on the policy requirements and identifies resource configurations that are available. Upon selecting a resource configuration, the distributed resources system assigns the allocation and associated values to the selected configuration and publishes the new configuration to other host computer nodes in the cluster.

17 Claims, 5 Drawing Sheets

(56) References Cited

U.S. PATENT DOCUMENTS

| | | | |
|---|---|---|---|
| 7,945,587 B2 | 5/2011 | Hardy | |
| 8,103,769 B1 | 1/2012 | Weiser et al. | |
| 8,621,178 B1 | 12/2013 | Lazar | |
| 9,218,264 B2* | 12/2015 | Xavier | G06F 11/3485 |
| 10,147,039 B1* | 12/2018 | Hayward | G06F 11/3051 |
| 2004/0181476 A1* | 9/2004 | Smith | G06Q 40/00 705/35 |
| 2006/0041580 A1* | 2/2006 | Ozdemir | H04L 67/1097 |
| 2007/0033368 A1* | 2/2007 | Taguchi | G06F 3/0644 711/170 |
| 2007/0073994 A1* | 3/2007 | Zohar | G06F 3/067 711/173 |
| 2009/0133028 A1 | 5/2009 | Brown et al. | |
| 2009/0172666 A1 | 7/2009 | Yahalom et al. | |
| 2011/0173302 A1* | 7/2011 | Rider | G06F 9/44505 709/220 |
| 2012/0239739 A1* | 9/2012 | Manglik | G06F 8/61 709/203 |
| 2013/0117494 A1 | 5/2013 | Hughes et al. | |
| 2013/0204849 A1 | 8/2013 | Chacko | |
| 2013/0212134 A1* | 8/2013 | S | H04L 67/1097 707/827 |
| 2014/0068183 A1 | 3/2014 | Joshi et al. | |
| 2014/0115579 A1 | 4/2014 | Kong | |
| 2014/0156925 A1 | 6/2014 | Baron et al. | |
| 2014/0269667 A1* | 9/2014 | Teague | H04W 56/0065 370/350 |
| 2016/0085594 A1 | 3/2016 | Wang et al. | |

* cited by examiner

TRANSLATING HIGH LEVEL REQUIREMENTS POLICIES TO DISTRIBUTED STORAGE CONFIGURATIONS

CROSS-REFERENCE TO RELATED APPLICATION(S)

This application claims the benefit of U.S. Provisional Patent Application No. 61/870,158, filed Aug. 26, 2013, and the benefit of U.S. patent application Ser. No. 14/469,424, filed Aug. 26, 2014, issued as U.S. Pat. No. 11,018,988. Each of these applications is hereby expressly incorporated by reference.

BACKGROUND

Distributed systems allow multiple clients in a network to access a pool of shared resources. For example, a distributed storage system allows a cluster of host computers to aggregate local disks (e.g., SSD, PCI-based flash storage, SATA, or SAS magnetic disks) located in or attached to each host computer to create a single and shared pool of storage. This pool of storage (sometimes referred to herein as a "datastore" or "store") is accessible by all host computers in the cluster and may be presented as a single namespace of storage entities (such as a hierarchical file system namespace in the case of files, a flat namespace of unique identifiers in the case of objects, etc.). Storage clients in turn, such as virtual machines spawned on the host computers may use the datastore, for example, to store virtual disks that are accessed by the virtual machines during their operation. Because the shared local disks that make up the datastore may have different performance characteristics (e.g., capacity, input/output operations per second or IOPS capabilities, etc.), usage of such shared local disks to store virtual disks or portions thereof may be distributed among the virtual machines based on the needs of each given virtual machine. This approach provides enterprises with cost-effective performance. For instance, distributed storage using pooled local disks is inexpensive, highly scalable, and relatively simple to manage. Because such distributed storage can use commodity disks in the cluster, enterprises do not need to invest in additional storage infrastructure.

Some distributed storage systems are object-based. As a result, creating objects across commodity disks includes several considerations for efficiently managing objects. For example, storage objects use multiple available resource types, such as IOPS (input/output operations per second) and capacity in solid state disks and magnetic disks. Further, some resource types may be more expensive than others. For instance, capacity in a solid state drive generally is more costly than capacity in magnetic disks, while IOPS in a magnetic disk is generally more costly than IOPS in a solid state drive. At the same time, the distributed storage system should avoid orphaning resource types to ensure that available may be consumed. Current approaches assign storage objects fixed amounts of capacity within a disk, which reduces object flexibility. Under such an approach, the system may, for example, partition the disk into N pieces for each object, and every object owner receives 1/Nth of the disk. As a result, each object owner may receive approximately the same amount of performance as other owners, yielding limited enforcement of operations and the inability to provide guaranteed quality of service.

SUMMARY

One or more embodiments disclosed herein provide a method for partitioning a resource object into multiple resource components in a cluster of host computer nodes of a distributed resources system. The method generally includes determining an allocation for the resource components based on a set of requirements for the resource object and identifying one or more available resource configurations in the distributed resources system capable of accommodating the allocation. The method also generally includes selecting one of the resource configurations and assigning the allocation to the selected resource configuration.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DETAILED DESCRIPTION

Figure 1:
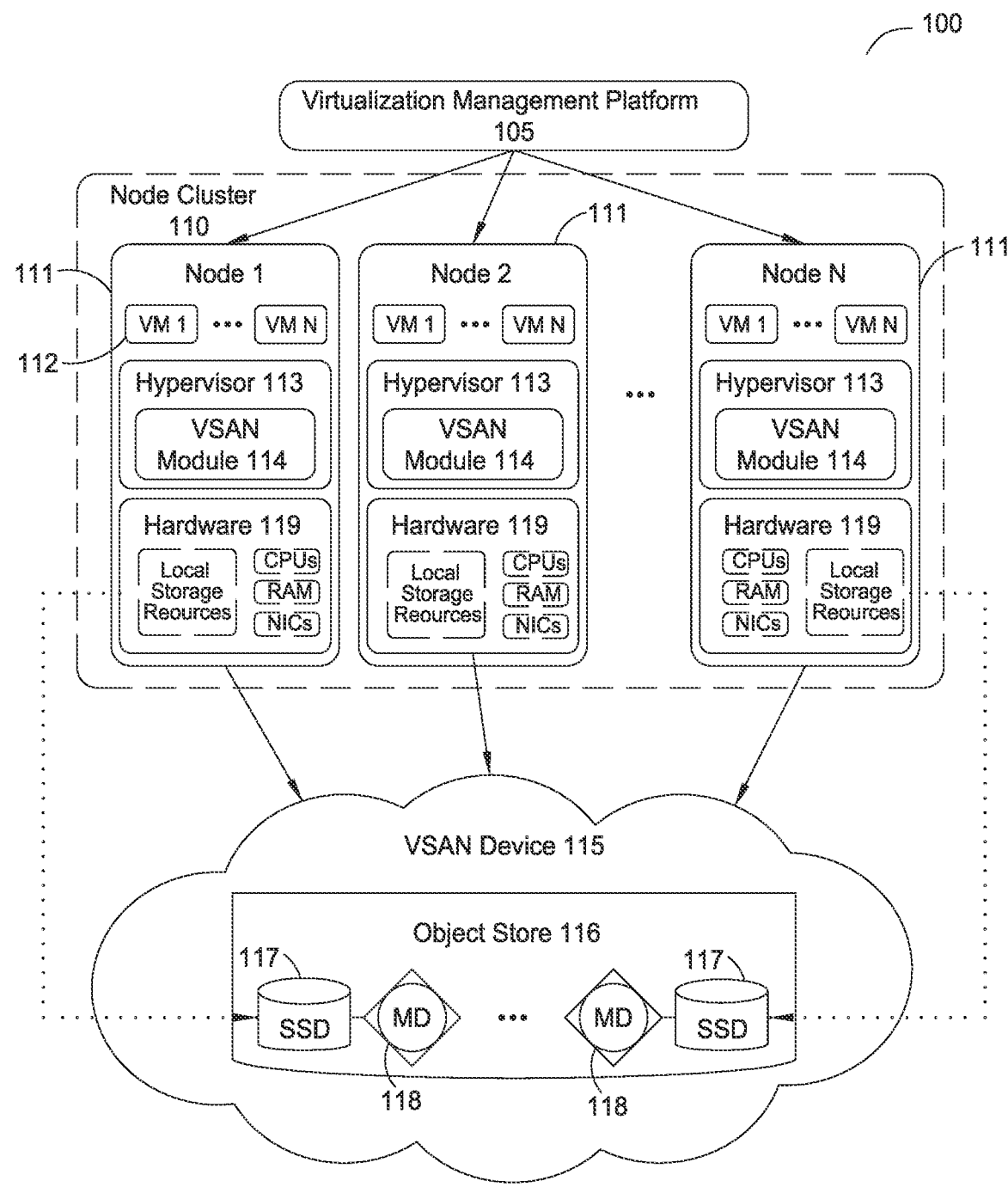
FIG. 1 illustrates an example computing environment, according to one embodiment.

Embodiments presented herein provide techniques for partitioning a multidimensional set of resources into components stored in clustered host computing system nodes. For example, techniques allow partitioning shared resources in a distributed storage system. In one embodiment, given a set of resource policy requirements, the distributed storage system determines an allocation of resources for each resource type. The distributed storage system identifies available resource configurations in the node cluster that are able to accommodate the requirements allocation. Once identified, the distributed storage system picks a resource configuration that attempts to optimally utilize resources in the cluster. This may be done, for example, by determining the most constrained resource type of each candidate group and optimizing for that, or by using a fitness function to optimize across multiple resource types. Thereafter, the distributed storage system assigns the values to the underlying resources of the configuration and updates the status of the object components across the node cluster.

For instance, the techniques described herein may apply to a distributed storage system where an administrator provides various sets of storage requirements for different systems that may use shared storage resources. One example of an applicable distributed storage system is a software-based "virtual storage area network" (VSAN) where host servers in a cluster each act as a node that contributes its commodity local storage resources (e.g., hard disk and/or solid state drives, etc.) to provide an aggregate "object" store. Each host server may include a storage management module (also referred to herein as a VSAN module) in order to automate storage management workflows (e.g., create objects in the object store, etc.) and provide access to objects in the object store (e.g., handle I/O operations to objects in the object store, etc.) based on predefined storage policies specified for objects in the object store. In one particular embodiment, the host servers further support the instantiation of virtual machines (VMs) which act as clients to the VSAN object store. In such an embodiment, the "objects" stored in the object store may include, for example, file system objects that may contain VM configuration files and virtual disk descriptor files, virtual disk objects that are accessed by the VMs during runtime and the like.

Further, in the example VSAN environment, storage object components are part of disk groups that include a solid state drive (SSD) and one or more magnetic disks. Generally, the SSD serves as a front-end read buffer and write cache for the magnetic disks that store object data. In one embodiment, the IOPS and capacity of both the SSD and the magnetic disks serve as different resource types for the VSAN resources to objects. In creating an object, a VSAN module translates policy requirements (e.g., capacity, IOPS) and workload characterizations (e.g., cache-miss rate, I/O request size) into a storage object configuration that is enforceable in local disks.

Reference is now made in detail to several embodiments, examples of which are illustrated in the accompanying figures. Note, that wherever practicable, similar or like reference numbers may be used in the figures and may indicate similar or like functionality. The figures depict embodiments for purposes of illustration only. One of skill in the art will readily recognize from the following description that alternative embodiments of the structures and methods illustrated herein may be employed without departing from the principles described herein.

In the following, an example VSAN module serves as a reference example that translates high-level policy requirements to resource component configurations. This reference example is included to provide an understanding of the embodiments described herein. However, it will be apparent to one of skill in the art that these embodiments are applicable in other contexts related to translating high level policies into multiple resource components. For example, embodiments may apply to other types of distributed resources system such as those related to CPU resources.

Similarly, numerous specific details are provided to provide a thorough understanding of the embodiments. One of skill in the art will recognize that the embodiments may be practiced without some of these specific details. In other instances, well known process operations and implementation details have not been described in detail to avoid unnecessary obscuring novel aspects of the disclosure.

FIG. 1 illustrates a computing environment 100, according to one embodiment. As shown, computing environment 100 is a VSAN environment that leverages the commodity local storage housed in or directly attached (hereinafter, use of the term "housed" or "housed in" may be used to encompass both housed in or otherwise directly attached) to host servers or nodes 111 of a cluster 110 to provide an aggregate object store 116 to virtual machines (VMs) 112 running on the nodes. The local commodity storage housed in or otherwise directly attached to the nodes 111 may include combinations of solid state drives (SSDs) 117 and/or magnetic or spinning disks 118. In certain embodiments, SSDs 117 serve as a read cache and/or write buffer in front of magnetic disks 118 to increase I/O performance.

A virtualization management platform 105 is associated with cluster 110 of nodes 111. Virtualization management platform 105 enables an administrator to manage the configuration and spawning of VMs on the various nodes 111. As depicted in the embodiment of FIG. 1, each node 111 includes a virtualization layer or hypervisor 113, a VSAN module 114, and hardware 119 (which includes the SSDs 117 and magnetic disks 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described further below, each hypervisor 113, through its corresponding VSAN module 114, provides access to storage resources located in hardware 119 (e.g., SSDs 117 and magnetic disks 118) for use as storage for virtual disks (or portions thereof) and other related files that may be accessed by any VM 112 residing in any of nodes 111 in cluster 110. In a particular embodiment, vSphere Hypervisor from VMware, Inc. (VMware) may be installed on nodes 111 as hypervisor 113 and vCenter Server from VMware may be used as virtualization management platform 105.

In one embodiment, VSAN module 114 is implemented as a "VSAN" device driver within hypervisor 113. In such an embodiment, VSAN module 114 provides access to a conceptual "VSAN" 115 through which an administrator can create a number of top-level "device" or namespace objects that are backed by object store 116. In one common scenario, during creation of a device object, the administrator may specify a particular file system for the device object (such device objects hereinafter also thus referred to "file system objects"). For example, in one embodiment, each hypervisor 113 in each node 111 may, during a boot process, discover a /vsan/root node for a conceptual global namespace that is exposed by VSAN module 114. By, for example, accessing APIs exposed by VSAN module 114, hypervisor 113 can then determine all the top-level file system objects (or other types of top-level device objects) currently residing in VSAN 115. When a VM (or other client) attempts to access one of the file system objects, hypervisor 113 may dynamically "auto-mount" the file system object at that time. A file system object (e.g., /vsan/fs_name1, etc.) that is accessible through VSAN 115 may, for example, be implemented to emulate the semantics of a particular file system such as VMware's distributed or clustered file system, VMFS, which is designed to provide concurrency control among simultaneously accessing VMs. Because VSAN 115 supports multiple file system objects, it is able provide storage resources through object store 116 without being confined by limitations of any particular clustered file system. For example, many clustered file systems (e.g., VMFS, etc.) can only scale to support a certain amount of nodes 111. By providing multiple top-level file system object support, VSAN 115 overcomes the scalability limitations of such clustered file systems.

As described in further detail in the context of FIG. 2 below, a file system object, may, itself, provide access to a number of virtual disk descriptor files (e.g., .vmdk files in a vSphere environment, etc.) accessible by VMs 112 running in cluster 110. These virtual disk descriptor files contain references to virtual disk "objects" that contain the actual data for the virtual disk and are separately backed by object store 116. A virtual disk object may itself be a hierarchical or "composite" object that, as described further below, is further composed of "component" objects (again separately backed by object store 116) that reflect the storage requirements (e.g., capacity, availability, IOPs, etc.) of a corresponding storage profile or policy generated by the administrator when initially creating the virtual disk. As further discussed below, each VSAN module 114 (through a cluster level object management or "CLOM" sub-module, in embodiments as further described below) communicates with other VSAN modules 114 of other nodes 111 to create and maintain an in-memory metadata database (e.g., maintained separately but in synchronized fashion in the memory of each node 111) that contains metadata describing the locations, configurations, policies and relationships among the various objects stored in object store 116. This in-memory metadata database is utilized by a VSAN module 114 on a node 111, for example, when an administrator first creates a virtual disk for a VM as well as when the VM is running and performing I/O operations (e.g., read or write) on the virtual disk. As further discussed below in the context of FIG. 3, VSAN module 114 (through a distributed object manager or "DOM" sub-module, in one embodiment as further described below) traverses a hierarchy of objects using the metadata in the in-memory database in order to properly route an I/O operation request to the node (or nodes) that houses (house) the actual physical local storage that backs the portion of the virtual disk that is subject to the I/O operation.

Figure 2:
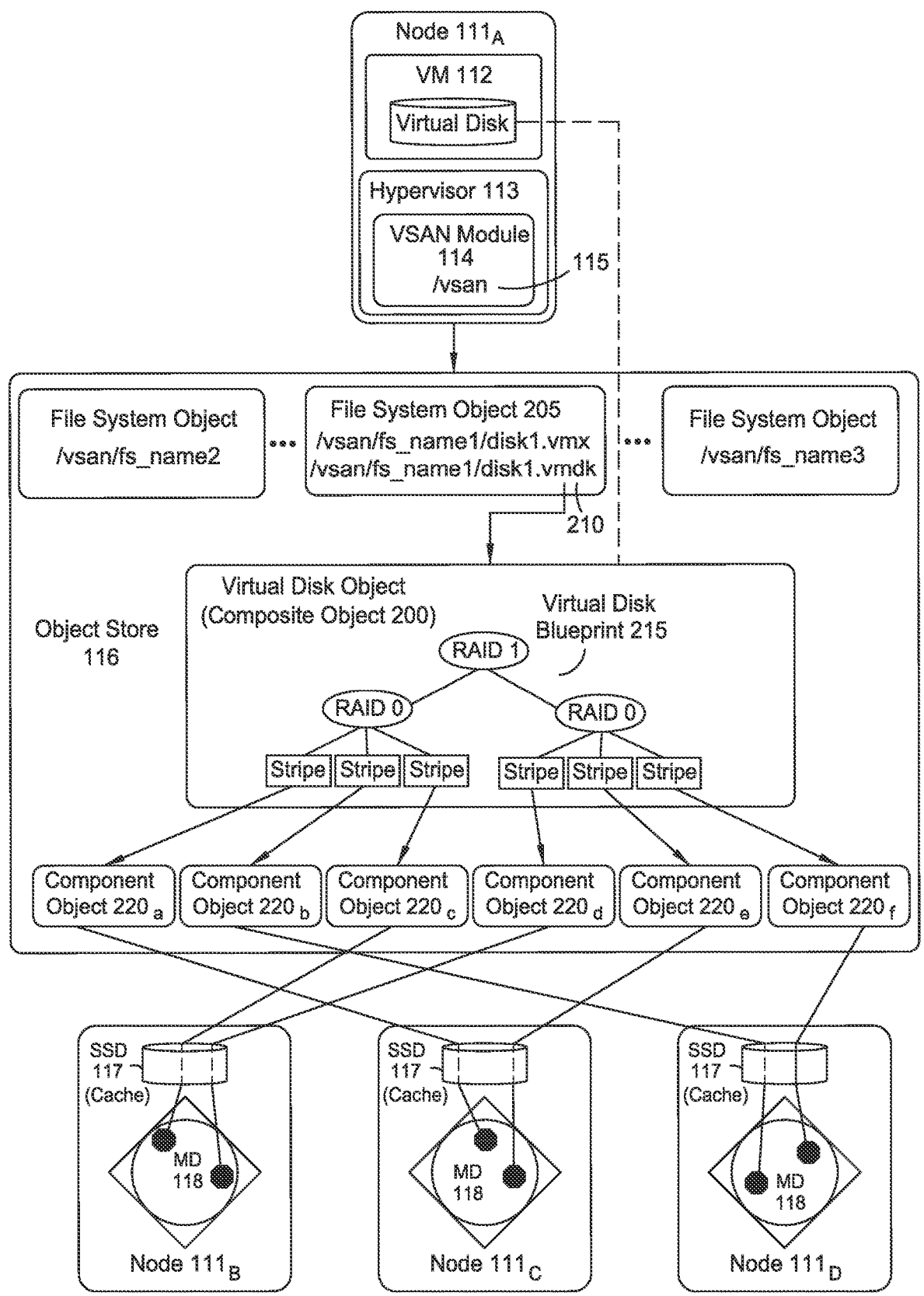
FIG. 2 illustrates an example hierarchical structure of objects organized within an object store that represent a virtual disk, according to one embodiment.

FIG. 2 illustrates an example hierarchical structure of objects organized within object store 116 that represent a virtual disk, according to one embodiment. As previously discussed above, a VM 112 running on one of nodes 111 may perform I/O operations on a virtual disk that is stored as a hierarchical or composite object 200 in object store 116. Hypervisor 113 provides VM 112 access to the virtual disk by interfacing with the abstraction of VSAN 115 through VSAN module 114 (e.g., by auto-mounting the top-level file system object corresponding to the virtual disk object, as previously discussed, in one embodiment). For example, VSAN module 114, by querying its local copy of the in-memory metadata database, is able to identify a particular file system object 205 (e.g., a VMFS file system object in one embodiment, etc.) stored in VSAN 115 that stores a descriptor file 210 for the virtual disk (e.g., a .vmdk file, etc.). It should be recognized that the file system object 205 may store a variety of other files consistent with its purpose, such as virtual machine configuration files (e.g., .vmx files in a vSphere environment, etc.) and the like when supporting a virtualization environment. In certain embodiments, each file system object may be configured to support only those virtual disks corresponding to a particular VM (e.g., a "per-VM" file system object).

Descriptor file 210 includes a reference to composite object 200 that is separately stored in object store 116 and conceptually represents the virtual disk (and thus may also be sometimes referenced herein as a virtual disk object). Composite object 200 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by an administrator when creating the virtual disk. For example, in the embodiment of FIG. 2, composite object 200 includes a virtual disk blueprint 215 that describes a RAID 1 configuration where two mirrored copies of the virtual disk (e.g., mirrors) are each further striped in a RAID 0 configuration. Composite object 200 may thus contain references to a number of "leaf" or "component" objects $220_x$ corresponding to each stripe (e.g., data partition of the virtual disk) in each of the virtual disk mirrors. The metadata accessible by VSAN module 114 in the in-memory metadata database for each component object 220 (e.g., for each stripe) provides a mapping to or otherwise identifies a particular node $111_x$ in cluster 110 that houses the physical storage resources (e.g., magnetic disks 118, etc.) that actually store the stripe (as well as the location of the stripe within such physical resource).

Figure 3:
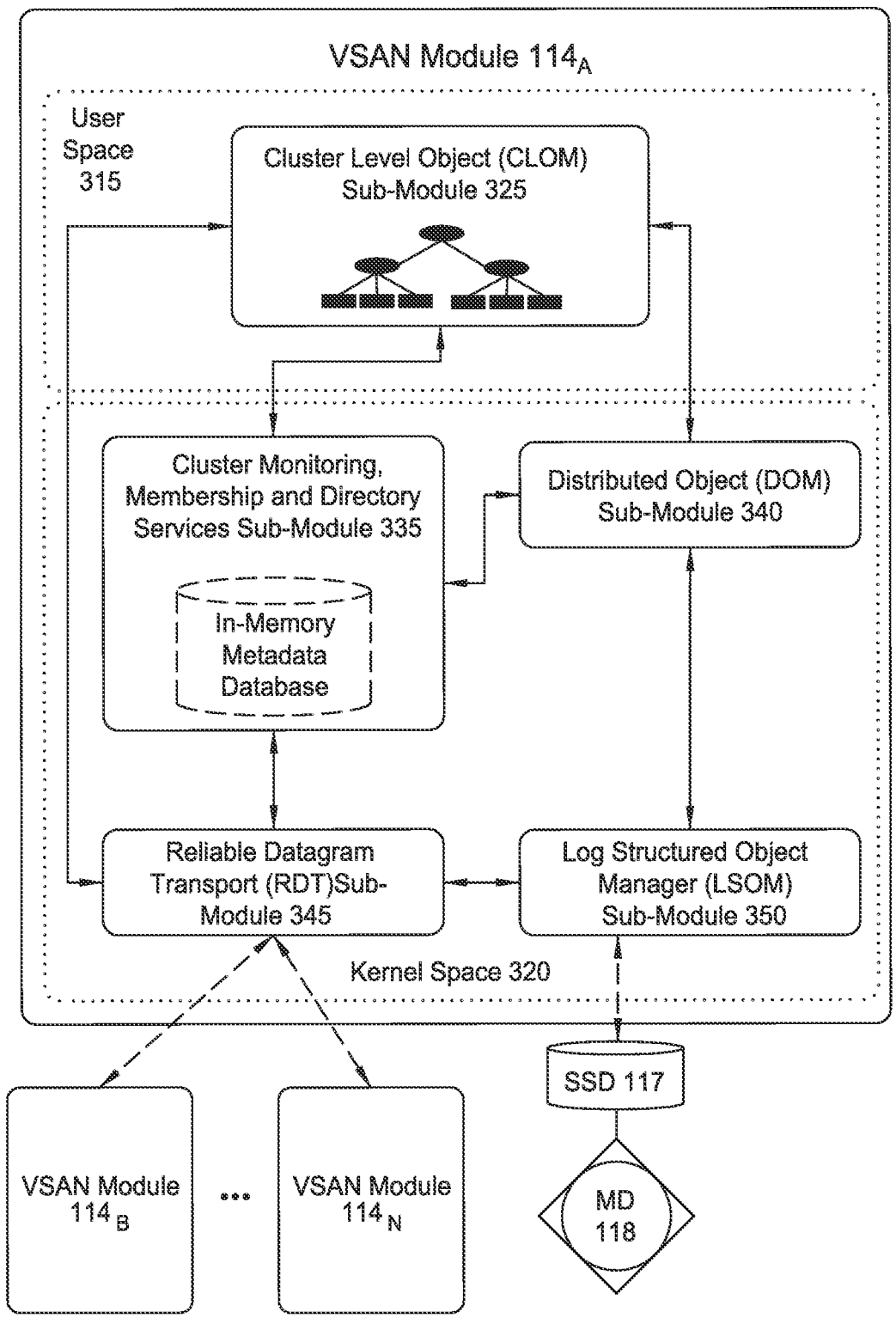
FIG. 3 illustrates components of a VSAN module, according to one embodiment.

FIG. 3 illustrates components of a VSAN module 114, according to one embodiment. As previously described, in certain embodiments, VSAN module 114 may execute as a device driver exposing an abstraction of a VSAN 115 to hypervisor 113. Various sub-modules of VSAN module 114 handle different responsibilities and may operate within either user space 315 or kernel space 320 depending on such responsibilities. As depicted in the embodiment of FIG. 3, VSAN module 114 includes a cluster level object management (CLOM) sub-module 325 that operates in user space 315. CLOM sub-module 325 generates virtual disk blueprints during creation of a virtual disk by an administrator and ensures that objects created for such virtual disk blueprints are configured to meet storage profile or policy requirements set by the administrator. In addition to being accessed during object creation (e.g., for virtual disks), CLOM sub-module 325 may also be accessed (e.g., to dynamically revise or otherwise update a virtual disk blueprint or the mappings of the virtual disk blueprint to actual physical storage in object store 116) on a change made by an administrator to the storage profile or policy relating to an object or when changes to the cluster or workload result in an object being out of compliance with a current storage profile or policy.

In one embodiment, if an administrator creates a storage profile or policy for a composite object such as virtual disk object 200, CLOM sub-module 325 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/ stripes of the virtual disk to achieve load balancing, etc.). For example, CLOM sub-module 325, in one embodiment, is responsible for generating blueprint 215 describing the RAID 1/RAID 0 configuration for virtual disk object 200 in FIG. 2 when the virtual disk was first created by the administrator. As previously discussed, a storage policy may specify requirements for capacity, IOPS, availability, and reliability. Storage policies may also specify a workload characterization (e.g., random or sequential access, I/O request size, cache size, expected cache hit ration, etc.). Additionally, the administrator may also specify an affinity to VSAN module 114 to preferentially use certain nodes 111 (or the local disks housed therein). For example, when provisioning a new virtual disk for a VM, an administrator may generate a storage policy or profile for the virtual disk specifying that the virtual disk have a reserve capacity of 400 GB, a reservation of 150 read IOPS, a reservation of 300 write IOPS, and a desired availability of 99.99%. Upon receipt of the generated storage policy, CLOM sub-module 325 consults the in-memory metadata database maintained by its VSAN module 114 to determine the current state of cluster 110 in order generate a virtual disk blueprint for a composite object (e.g., the virtual disk object) that suits the generated storage policy. As further discussed below, CLOM sub-module 325 may then communicate the blueprint to its corresponding distributed object manager (DOM) sub-module 340 which interacts with object store 116 to implement the blueprint by, for example, allocating or otherwise mapping component objects (e.g., stripes) of the composite object to physical storage locations within various nodes 111 of cluster 110.

In addition to CLOM sub-module 325 and DOM sub-module 340, as further depicted in FIG. 3, VSAN module 114 may also include a cluster monitoring, membership, and directory services (CMMDS) sub-module 335 that maintains the previously discussed in-memory metadata database to provide information on the state of cluster 110 to other sub-modules of VSAN module 114 and also tracks the general "health" of cluster 110 by monitoring the status, accessibility, and visibility of each node 111 in cluster 110. The in-memory metadata database serves as a directory service that maintains a physical inventory of the VSAN environment, such as the various nodes 111, the storage resources in the nodes 111 (SSD, magnetic disks, etc.) housed therein and the characteristics/capabilities thereof, the current state of the nodes 111 and there corresponding storage resources, network paths among the nodes 111, and the like. As previously discussed, in addition to maintaining a physical inventory, the in-memory metadata database further provides a catalog of metadata for objects stored in object store 116 (e.g., what composite and component objects exist, what component objects belong to what composite objects, which nodes serve as "coordinators" or "owners" that control access to which objects, quality of service requirements for each object, object configurations, the mapping of objects to physical storage locations, etc.). As previously discussed, other sub-modules within VSAN module 114 may access CMMDS sub-module 335 (represented by the connecting lines in FIG. 3) for updates to learn of changes in cluster topology and object configurations. For example, as previously discussed, during virtual disk creation, CLOM sub-module 325 accesses the in-memory metadata database to generate a virtual disk blueprint, and in order to handle an I/O operation from a running VM 112, DOM sub-module 340 accesses the in-memory metadata database to determine the nodes 111 that store the component objects (e.g., stripes) of a corresponding composite object (e.g., virtual disk object) and the paths by which those nodes are reachable in order to satisfy the I/O operation.

As previously discussed, DOM sub-module 340, during the handling of I/O operations as well as during object creation, controls access to and handles operations on those component objects in object store 116 that are stored in the local storage of the particular node 111 in which DOM sub-module 340 runs as well as certain other composite objects for which its node 111 has been currently designated as the "coordinator" or "owner." For example, when handling an I/O operation from a VM, due to the hierarchical nature of composite objects in certain embodiments, a DOM sub-module 340 that serves as the coordinator for the target composite object (e.g., the virtual disk object that is subject to the I/O operation) may need to further communicate across the network with a different DOM sub-module 340 in a second node 111 (or nodes) that serves as the coordinator for the particular component object (e.g., stripe, etc.) of the virtual disk object that is stored in the local storage of the second node 111 and which is the portion of the virtual disk that is subject to the I/O operation. If the VM issuing the I/O operation resides on a node 111 that is also different from the coordinator of the virtual disk object, the DOM sub-module 340 of the node running the VM would also have to communicate across the network with the DOM sub-module 340 of the coordinator. In certain embodiments, if the VM issuing the I/O operation resides on node that is different from the coordinator of the virtual disk object subject to the I/O operation, the two DOM sub-modules 340 of the two nodes may to communicate to change the role of the coordinator of the virtual disk object to the node running the VM (e.g., thereby reducing the amount of network communication needed to coordinate I/O operations between the node running the VM and the node serving as the coordinator for the virtual disk object).

DOM sub-modules 340 also similarly communicate amongst one another during object creation. For example, a virtual disk blueprint generated by CLOM module 325 during creation of a virtual disk may include information that designates which nodes 111 should serve as the coordinators for the virtual disk object as well as its corresponding component objects (stripes, etc.). Each of the DOM sub-modules 340 for such designated nodes is issued requests (e.g., by the DOM sub-module 340 designated as the coordinator for the virtual disk object or by the DOM sub-module 340 of the node generating the virtual disk blueprint, etc. depending on embodiments) to create their respective objects, allocate local storage to such objects (if needed), and advertise their objects to their corresponding CMMDS sub-module 335 in order to update the in-memory metadata database with metadata regarding the object. In order to perform such requests, DOM sub-module 340 interacts with a log structured object manager (LSOM) sub-module 350 that serves as the component in VSAN module 114 that actually drives communication with the local SSDs and magnetic disks of its node 111. In addition to allocating local storage for component objects (as well as to store other metadata such a policies and configurations for composite objects for which its node serves as coordinator, etc.), LSOM sub-module 350 additionally monitors the flow of I/O operations to the local storage of its node 111.

FIG. 3 also depicts a reliable datagram transport (RDT) sub-module 345 that delivers datagrams of arbitrary size between logical endpoints (e.g., nodes, objects, etc.), where the endpoints may potentially be over multiple paths. In one embodiment, the underlying transport is TCP. Alternatively, other transports such as RDMA may be used. RDT sub-module 345 is used, for example, when DOM sub-modules 340 communicate with one another, as previously discussed above to create objects or to handle I/O operations. In certain embodiments, RDT module 345 interacts with CMMDS module 335 to resolve the address of logical endpoints dynamically in order to maintain up-to-date location information in the in-memory metadata database as well as to create, remove, or reestablish connections based on link health status. For example, if CMMDS module 335 reports a link as unhealthy, RDT sub-module 345 may drop the connection in favor of a link in better condition.

Figure 4:
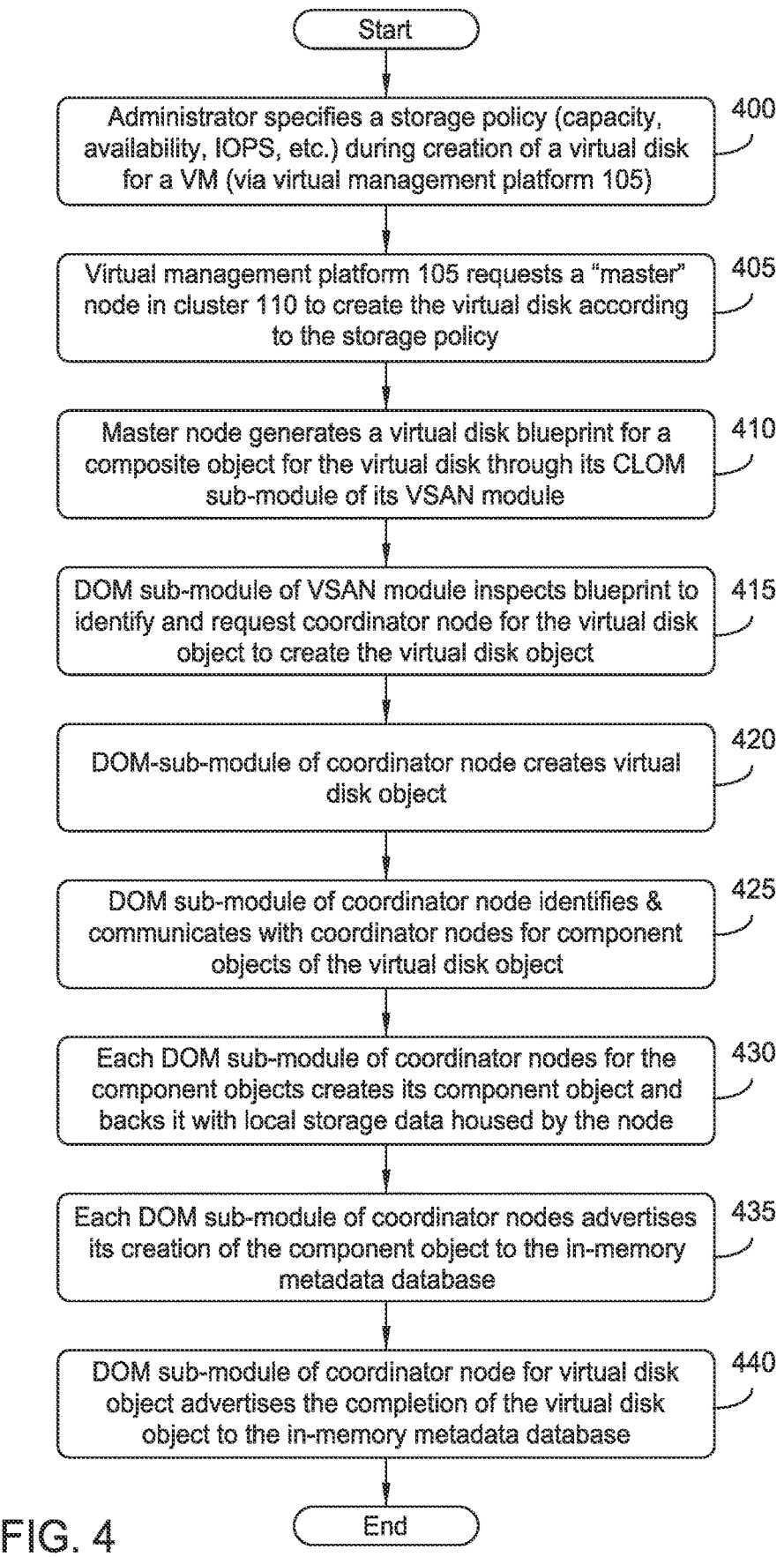
FIG. 4 illustrates a method flow diagram for creating a virtual disk object based on a defined storage policy, according to one embodiment.

FIG. 4 illustrates a method flow diagram for creating a virtual disk object based on a defined storage policy, according to one embodiment. For example, in step 400, an administrator may interact with a user interface of virtual management platform 105 to create a virtual disk having capacity, availability and IOPS requirements (e.g., the defined storage policy). In one embodiment, virtual management platform 105 may then request a "master" node 111 to create an object for the virtual disk in step 405. In step 410, such a master node 111 may generate a virtual disk blueprint through its CLOM sub-module 325 in VSAN module. As previously discussed, CLOM sub-module 35 generates a virtual disk blueprint for the creation of a virtual disk object (e.g., a composite object) based on the status of cluster 110 as determined by consulting the in-memory metadata database of CMMDS sub-module 335. The virtual disk blueprint may identify a particular node that should serve as the coordinator or owner of the virtual disk object. In step 415, the DOM sub-module 340 of the master node 111 may the request the DOM sub-module 340 of the identified node to create the virtual disk object. In step 420, the DOM sub-module 340 of the identified node receives the request and creates the virtual disk object, by, for example, communicating with its corresponding the LSOM sub-module 350 to persistently store metadata describing the virtual disk object in its local storage. In step 425, the DOM sub-module 340, based on the virtual disk object blueprint, identifies those others nodes in cluster 110 that have been designated to serve as the coordinator or owner for any component objects in the virtual disk blueprint. The DOM sub-module 340 communicates (e.g., using its RDT sub-module 345) with the DOM sub-modules 340 of the other nodes that will serve as coordinators for the component objects and store the data backing such component objects in their local storage. When such DOM sub-modules 340 receive a request from the DOM sub-module 340 of the coordinator of the virtual disk object to create their respective component objects, they, in turn in step 430, communicate with their respective LSOM modules 350 to allocate local storage for the component object (and its related metadata). Once such component objects have been created, their DOM sub-modules 340 advertise the creation of the components to the in-memory metadata database of its CMMDS sub-module 335 in step 435. In step 440, in turn, the DOM sub-module 340 for the coordinator of the virtual disk object also advertises its creation to its CMMDS sub-module 335 to update the in-memory metadata database and ultimately transmits an acknowledgement to the administrator (e.g., via the master node communications back to virtual management platform 105).

Figure 5:
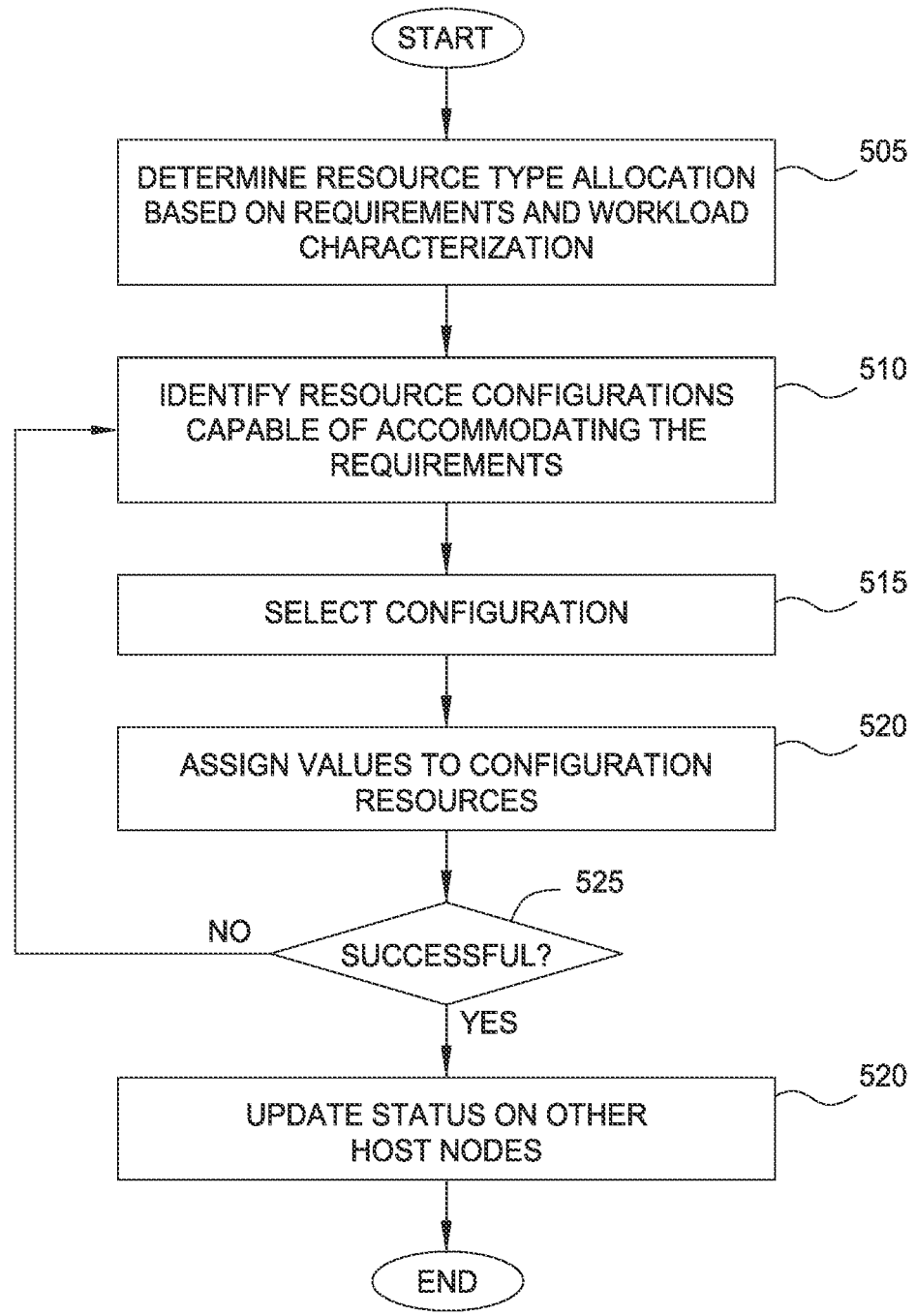
FIG. 5 illustrates a method for partitioning a set of resources into components, according to one embodiment.

FIG. 5 illustrates a method 500 for designating and partitioning resource objects into components to store in separate nodes, according to one embodiment. The resources may correspond to a disk group having an SSD and a magnetic disk, both disks each having capacity and IOPS. At storage object creation, a DOM sub-module 340 of a node 111 designated by the "master" node 111 receives policy requirements and workload characterizations. DOM sub-module 340 transmits the requirements and characterizations to the local CLOM sub-module 325 of VSAN module 114. As previously discussed, in assigning object components to disks, CLOM sub-module 325 translates policies into a configuration that is subject to various constraints and requirements (e.g., redundancy, policy, etc.). Further, CLOM sub-module 325 determines the state of the cluster reflected in the directory services of CMMDS module 335 and attempts to build a RAID (or RAIN) configuration that satisfies the requirements.

Method 500 begins in step 505, where CLOM sub-module 325 determines the resource allocation based on the set of requirements and workload characterizations for a given object. The requirements and workload characterization act as constraints that may determine placement. An example of a constraint based on the requirements is fragmentation. For instance, if an object requires 100 GB of disk capacity, and this capacity is unavailable on one particular disk across the node cluster, CLOM sub-module 325 may have to choose a RAID configuration that stripes widely (e.g., across ten distinct disks having 10 GB capacity). In the VSAN environment, VSAN module 114 monitors specific performance levels as opposed to a percentage of the resources. As another example of a constraint, the resources are also subject to redundancy requirements. That is, a policy requirement may specify a measure of how fault tolerant a configuration should be. For instance, a three-way RAID-1 configuration may be appropriate in cases when the requirements specify tolerance for two host failures.

Further, CLOM sub-module 325 may use a cache-miss profile provided by the work characterizations as part of a basis in determining an appropriate configuration of SSD and magnetic disk resources. In one embodiment, a cache-miss profile is a histogram indicating the expected cache-miss rate for a given cache size for the workload intended for the object. In such a case, the histogram represents the cache size as an integer percentage of the estimated physical size of the object and the histogram represents the hit rate as an integer percentage. CLOM sub-module 325 may use the cache-miss profile to determine what percentage of read operations may come from the SSD cache of an object component. As stated, in the VSAN environment, SSDs serve as a read cache and a write buffer. In one embodiment, although the RAID configurations mirror magnetic disk information, SSD re-caches are not mirrored. For example, given a RAID-1 two-way configuration, a VSAN module 114 provides copies of the data on two magnetic disks. However, the same SSD cache may be assigned to both copies. As a result, during an operation, if there is a miss in reading from the cache, the operation instead accesses the magnetic disk for the data.

CLOM sub-module 325 uses the cache-miss profile to determine how many read operations come from the cache and how many are reserved on the magnetic disk. In effect, CLOM sub-module 325 may determine the amount of SSD resources (i.e., capacity and IOPS) to assign to a particular component to afford IOPS on magnetic disks for read misses, cache misses, and given space on a SSD (based on the current cluster balance). This allows efficient use of expensive SSD space and magnetic disk IOPS and inexpensive SSD IOPS and magnetic disk space and ensures that the more expensive resources are depleted at about the same level as the more inexpensive resources. That is, for example, if a resource is low on SSD capacity, CLOM sub-module 325 can allow the object to use more magnetic disk IOPS by assigning less cache space (resulting in more cache misses). CLOM sub-module 325 can redress imbalance by trading off SSD space and magnetic disk IOPS, the more expensive resources in the disk group. For example, if, in a given disk group, the SSD capacity is at 70% usage, and the magnetic disk IOPS is at 30% usage, CLOM sub-module 325 may assign a higher cache miss rate to use more magnetic disk IOPS.

In step 510, CLOM sub-module 325 identifies available disk configurations across the node cluster capable of satisfying the requirements and workload characterizations. Generally, CLOM sub-module 325 aims for a configuration that provides a reasonable balance of usage within a disk group. To determine whether a configuration satisfies the requirements, for each given configuration, CLOM sub-module 325 computes the resources provided by the total configuration based on the resources provided by the individual disks and RAID types joining the disks. For example, if two disks each provide a 1 GB component and join a RAID-1 node, the total capacity provided is 1 GB. However, if the two disks join a RAID-0 instead, the total capacity is 2 GB. Further, CLOM sub-module 325 calculates the cost of each configuration similarly. In one embodiment, the cost may include the total number of physical bytes of storage that the configuration uses and a penalty of 1 for each RAID node. In effect, doing so provides CLOM sub-module 325 a bias towards simpler configurations.

In step 515, CLOM sub-module 325 selects a configuration. In one embodiment, CLOM sub-module 325 selects the configuration at random to avoid choosing the same configuration with other CLOM sub-modules 325 in the node cluster running in parallel. After selecting a configuration, CLOM sub-module 325 communicates the configuration data to the local DOM sub-module 340. In step 520, the DOM sub-module 340 performs a distributed transaction to create the component object within the local disks. In the prepare phase, the DOM sub-module 340 communicates to the other hosts to create the objects having the configuration specified by the CLOM module. If the prepare is successful (at step 525), DOM sub-module 340 asks the other hosts to commit the transaction and thereafter creates the corresponding object components on the node based on the configuration. DOM sub-module 340 assigns resource values to the local disks, and LSOM sub-module 350 enforces the configuration based on the given policy requirements and workload characterization.

After creating the object components, DOM sub-modules 340 on the other nodes designated in the configuration act as component manager and communicate with each respective LSOM sub-module 350 to persist the component and object metadata, effectively serving as storage for one or more virtual machine clients. In step 530, DOM sub-modules 340 designated as component manager also advertise the components to the directory services of the respective CMMDS sub-modules 335. DOM sub-module 340 on the local node 111, in turn, advertises the object to the directory services.

In some cases, the prepare phase may fail. Although each CLOM sub-module 325 randomly selects a configuration, multiple CLOM sub-modules 325 may sometimes designate the same configuration. For example, assume a particular node 111 has limited magnetic disk capacity, and two hosts, after performing method 600, are attempting to reserve 90% of the remaining magnetic disk capacity. In one embodiment, an election protocol in the CLOM sub-module 325 of the competing nodes 111 determines which node is successful. In such a case, one node 111 prevails over the other node 111 (i.e., the node successfully reserves the magnetic disk capacity), and the DOM sub-module 340 of the unsuccessful node 111 aborts the distributed transaction. In response, the CLOM sub-module 325 of the unsuccessful node 111 again identifies available resource configurations in the cluster that may accommodate the requirements (at step 510).

As stated, CLOM sub-module 325 follows a set of heuristics to obtain a relatively balanced (i.e., not necessarily optimally balanced) configuration with regard to percentage of usage across each of the resources in the disk group. In the event that the final configuration, as implemented in practice, is unbalanced, CLOM sub-module 325 may rebalance and migrate the resource usage to other disk groups. Other cases may arise when the policy for a given object changes and specifies different inputs (e.g., in capacity, operations, etc.). For example, assume that a current object configuration has reserved 1000 operations and a new policy for the object requires 2000 operations instead. Rather than create a new object configuration altogether, CLOM sub-module 325 aims to use as much of the existing configuration as possible. For example, CLOM sub-module 325 preferentially selects disks in the existing configuration. As another example, to account for an increase in IOPS, CLOM sub-module 325 may create another RAID mirror for the object as opposed to restriping the RAID configuration. At any rate, once CLOM sub-module 325 has determined a suitable configuration, CLOM sub-module 325 communicates the reconfiguration to DOM sub-module 340. In turn, DOM sub-module 340 performs the same distributed transaction as described above to commit the new configuration.

As described, embodiments described herein provide techniques for partitioning a multidimensional set of resource objects of a distributed resources system into components based on policy requirements. Advantageously, partitioning disks in variable-sized amounts (instead of fixed-sized amounts) based on resource type allows for greater storage object flexibility and more efficient use of disk resources. Further, because VSAN module 114 establishes a quota for inputs (i.e., requirements and workload characterization) as opposed to output, VSAN module 114 is able to enforce the requirements and provide quality of service for the storage objects in the VSAN environment. Additionally, aiming for reasonably balanced configurations, this approach allows the VSAN to avoid orphaning and wasting disk resources.

Generally speaking, the various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for partitioning a resource object into multiple resource components by a host computer node of a cluster of host computer nodes, the resource object providing storage resources to a process executing on the host computer node, the method comprising:
    identifying a plurality of available resource configurations of physical storage resources in a distributed resources system capable of accommodating the multiple resource components and complying with a set of requirements for the resource object, the distributed resources system comprising an aggregate of local physical storage resources of each host computer node in the cluster of host computer nodes;
    selecting a resource configuration of the plurality of available resource configurations using a resource configuration selection scheme that penalizes resource configurations with higher numbers of redundant storage nodes;
    generating a mapping between the multiple resource components and local physical storage resources associated with the selected resource configuration; and
    assigning the multiple resource components to the selected resource configuration.

2. The method of claim 1, further comprising publishing a status of the assigned multiple resource components to each host computer node in the cluster, wherein identifying the plurality of available resource configurations further comprises determining which of the physical storage resources in the distributed resources system are available based on a previously published status of other assigned multiple resource components.

3. The method of claim 1, wherein the distributed resources system comprises a software-defined virtual storage area network, and wherein the cluster of host computer nodes provide the aggregate of local physical storage resources to virtual machines.

4. The method of claim 1, wherein the selecting the resource configuration comprises selecting the resource configuration further based on a fitness function for maintaining balanced usage of different resource types across different resource components.

5. The method of claim 1, wherein assigning the multiple resource components to the selected resource configuration further comprises:
    creating the multiple resource components on corresponding physical storage resources of the selected resource configuration; and
    creating object components on the host computer node, each of the object components corresponding to one of the multiple resource components.

6. The method of claim 1, wherein the set of requirements provide a cache-miss profile of the process, the cache-miss profile being a histogram indicating a cache-miss rate for a given cache size for a workload intended for the process.

7. A non-transitory computer-readable storage medium storing instructions, which, when executed by a host computer node of a cluster of host computer nodes, cause the host computer node to perform operations for partitioning a resource object into multiple resource components, the resource object providing storage resources to a process executing on the host computer node, the operations comprising:
    identifying a plurality of available resource configurations of physical storage resources in a distributed resources system capable of accommodating the multiple resource components and complying with a set of requirements for the resource object, the distributed resources system comprising an aggregate of local physical storage resources of each host computer node in the cluster of host computer nodes;
    selecting a resource configuration of the plurality of available resource configurations using a resource configuration selection scheme that penalizes resource configurations with higher numbers of redundant storage nodes;
    generating a mapping between the multiple resource components and local physical storage resources associated with the selected resource configuration; and
    assigning the multiple resource components to the selected resource configuration.

8. The non-transitory computer-readable storage medium of claim 7, wherein the operations further comprise publishing a status of the assigned multiple resource components to each host computer node in the cluster, wherein identifying the plurality of available resource configurations further comprises determining which of the physical storage resources in the distributed resources system are available based on a previously published status of other assigned multiple resource components.

9. The non-transitory computer-readable storage medium of claim 7, wherein the distributed resources system comprises a software-defined virtual storage area network, and wherein the cluster of host computer nodes provide the aggregate of local physical storage resources to virtual machines.

10. The non-transitory computer-readable storage medium of claim 7, wherein the selecting the resource configuration comprises selecting the resource configuration further based on a fitness function for maintaining balanced usage of different resource types across different resource components.

11. The non-transitory computer-readable storage medium of claim 7, wherein assigning the multiple resource components to the selected resource configuration further comprises:
　creating the multiple resource components on corresponding physical storage resources of the selected resource configuration; and
　creating object components on the host computer node, each of the object components corresponding to one of the multiple resource components.

12. The non-transitory computer-readable storage medium of claim 7, wherein the set of requirements provide a cache-miss profile of the process, the cache-miss profile being a histogram indicating a cache-miss rate for a given cache size for a workload intended for the process.

13. A host computer node of a cluster of host computer nodes, comprising:
　a processor; and
　a memory hosting an application, which, when executed on the processor, performs operations for partitioning a resource object into multiple resource components, the resource object providing storage resources to a process executing on the host computer node, the operations comprising:
　　identifying a plurality of available resource configurations of physical storage resources in a distributed resources system capable of accommodating the multiple resource components and complying with a set of requirements for the resource object, the distributed resources system comprising an aggregate of local physical storage resources of each host computer node in the cluster of host computer nodes;
　　selecting a resource configuration of the plurality of available resource configurations using a resource configuration selection scheme that penalizes resource configurations with higher numbers of redundant storage nodes;
　　generating a mapping between the multiple resource components and local physical storage resources associated with the selected resource configuration; and
　　assigning the multiple resource components to the selected resource configuration.

14. The host computer node of claim 13, wherein the operations further comprise publishing a status of the assigned multiple resource components to each host computer node in the cluster, wherein identifying the plurality of available resource configurations further comprises determining which of the physical storage resources in the distributed resources system are available based on a previously published status of other assigned multiple resource components.

15. The host computer node of claim 13, wherein the distributed resources system comprises a software-defined virtual storage area network, and wherein the cluster of host computer nodes provide the aggregate of local physical storage resources to virtual machines.

16. The host computer node of claim 13, wherein the selecting the resource configuration comprises selecting the resource configuration further based on a fitness function for maintaining balanced usage of different resource types across different resource components.

17. The host computer node of claim 13, wherein assigning the multiple resource components to the selected resource configuration further comprises:
　creating the multiple resource components on corresponding physical storage resources of the selected resource configuration; and
　creating object components on the host computer node, each of the object components corresponding to one of the multiple resource components.

\* \* \* \* \*